DIPLEX TELEGRAPH SYSTEM USING FREQUENCY MODULATION

Filed May 19, 1961

INVENTOR.
CHRISTOPHER BUFF
BY Arthur M Lieberman
AGENT

United States Patent Office 3,048,657
Patented Aug. 7, 1962

3,048,657
DIPLEX TELEGRAPH SYSTEM USING FREQUENCY MODULATION

Christopher Buff, Massapequa, N.Y., assignor, by mesne assignments, to American Cable & Radio Corporation, New York, N.Y., a corporation of Delaware Filed May 19, 1961, Ser. No. 111,337
3 Claims. (Cl. 178—61)

This invention relates to telegraph systems and in particular those employing frequency modulation. This type of modulation has generally been found to be superior to amplitude modulation (on-off) since it is practically immune to sudden or slow changes in receive signal level, within its entire range of sensitivity, and gives a greatly improved signal-to-noise ratio.

In the usual multi-tone FM telegraph systems, each channel normally requires separate "mark" and "space" frequencies, equi-spaced on either side of a nominal and actually non-existent center frequency reference. This entails the inherent disadvantage of using two frequencies for one channel, four frequencies for two channels, and so on (e.g., Twinplex), with the result that the band width is fixed by the dual frequencies and practical separation.

The object of this invention is to provide an improved multi-channel frequency modulation telegraph system whereby the bandwidth necessary to transmit and receive a pair of channels is reduced without seriously affecting the signal-to-noise ratio.

Accordingly, the essence of the present invention resides in the utilization of a central frequency as a common mark frequency for two channels. It is thus possible to transmit and receive two messages simultaneously by using two frequencies spaced from the center frequency and responsive to the respective "space" indications of the two channels.

The inventive concept may be visualized by referring to the following table which indicates all of the possible combinations:

| Channel 1 | Channel 2 | Simultaneously transmitted signals |
|---|---|---|
| M | M | $f_o$ |
| S | M | $f_o; f_o+f_s$ |
| M | S | $f_o; f_o-f_s$ |
| S | S | $f_o+f_s; f_o-f_s$ |

Where: $f_o$ equals the center frequency and $f_s$ equals a predetermined constant.

Note that a minimum of one and a maximum of two frequencies are continuously present.

Thus when channel 1 is on "space," spaced frequency $f_o+f_s$ is initiated and when it is on "mark" the center frequency $f_o$ is employed. Similarly channel 2 calls for spaced frequency $f_o-f_s$ on "space" and $f_o$ on "mark."

From the above it may be seen that there is no need for the channels to be synchronized since all the possible conditions which may occur at any one instant are encompassed within the range of combinations. In other words, should one channel switch from mark to space, or vice versa, while the other is at a constant value, a new combination would be realized and one frequency would be deleted and another substituted in its place.

The above-mentioned and other features and objects of this invention will become more apparent by reference to the following description taken in conjunction with the accompanying drawings in which.

Figures 1, 2:
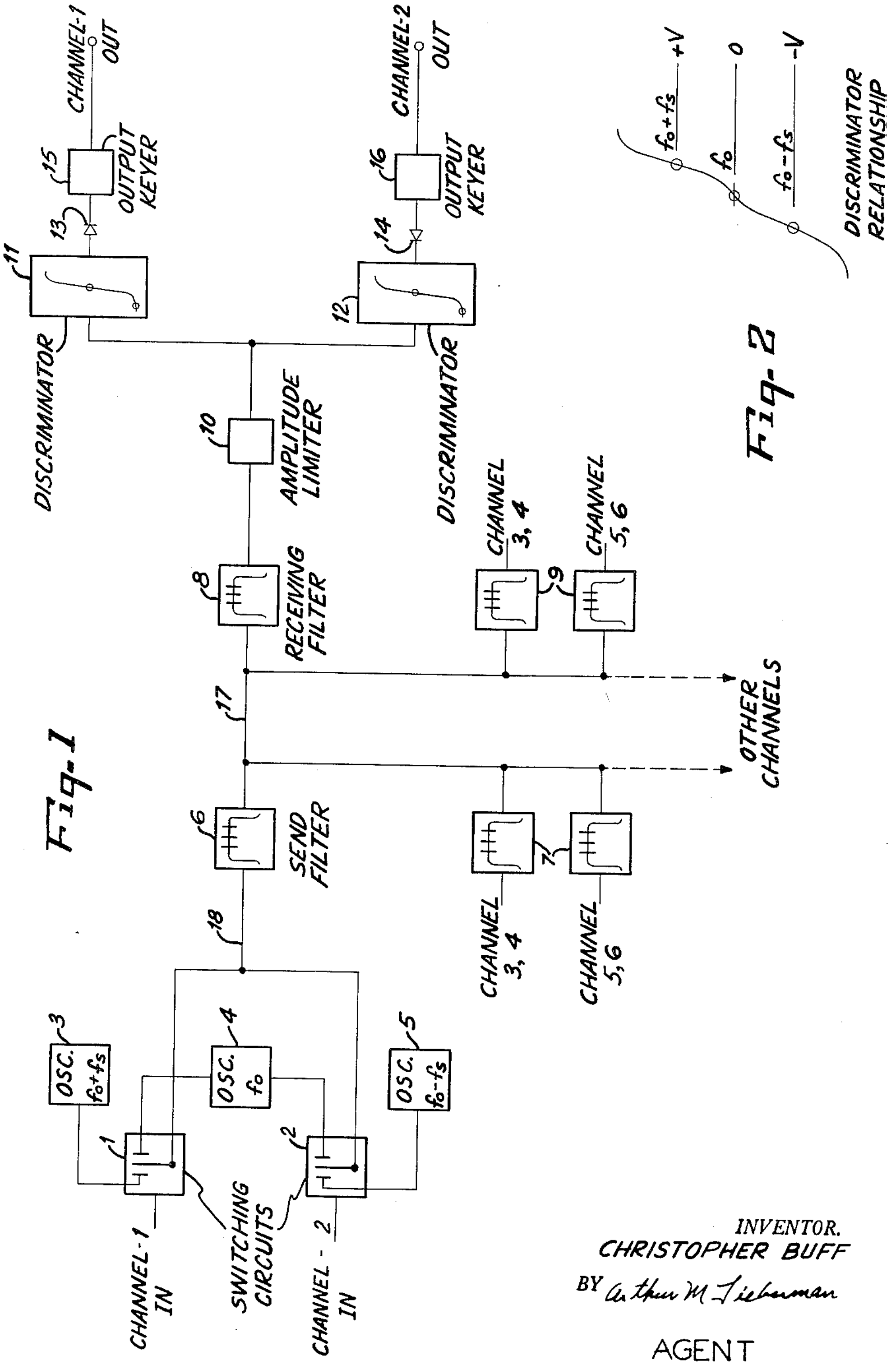
FIGURE 1 illustrates in block form a 3-frequency, 2 channel telegraph system according to the invention.
FIGURE 2 illustrates the discriminator curve relationships and resultant voltages occurring at the receiver.

In order to obtain the three distinct frequencies mentioned, any conventional means may be employed, the only necessary limitation being that the frequencies are reasonably stable because of their proximity to each other.

Referring now to FIG. 1, it may be seeen that oscillators 3, 4 and 5 supply the desired frequencies $f_o+f_s$, $f_o$ and $f_o-f_s$ respectively. (Three representative values of these frequencies are: 467, 425 and 383 c.p.s. respectively.) It may be noted that an $f_o$ oscillator utilized in combination with an $f_s$ oscillator and a frequency adder and subtractor circuit would produce the same result; as would two $f_o$ oscillators (one for each channel) and two spaced frequency oscillators $f_o+f_s$ and $f_o-f_s$.

Oscillators 3, 4 and 5 are switched on to the common output line 18 in response to the respective "mark" and "space" indications of channels 1 and 2, by switching circuits 1 and 2 respectively. Circuits such as these are well known in the art and may consist of transistors, relays, vacuum tubes or diodes, etc., arranged to switch one oscillator on the line for one binary representation (mark), and the other oscillator on the line for the other binary representation (space). Thus, for example, if channel 1 is emitting a space and channel 2 a mark, switching circuit 1 will connect oscillator 3 and switching circuit 2 oscillator 4, to the common line.

Thus the appropriate frequencies (or frequency) are jointly sent over common line 15 and pass through the "send" filter 6, where any extraneous harmonics are rejected. The additional filters 7 are included to allow the multipling of like apparatuses, servicing other channels, to a common transmission path 17. This path carries multiple channels according to the frequency allocations thereof and may comprise simply a pair of wires or a more complicated carrier or radio link with its associated equipment.

At the receiving end, the "receive" filter 8 passes only those frequencies allocated to channels 1 and 2 and rejects all others; similar filters 9 are provided for the other channel paths (3, 4 etc.). The three frequencies $f_o$, $f_o+f_s$ and $f_o-f_s$ enter a common amplitude limiter 10, the output of which is branched into two separate discriminators, 11 and 12. These discriminators are so tuned that the $f_o+f_s$ frequency falls in the center of the linear portion of the characteristic curve for discriminator 11 and the $f_o-f_s$ frequency falls in the center of the linear portion of the characteristic curve for discriminator 12 (see FIG. 2). The $f_o$ frequency falls at the common knee of the two curves. This arrangement prevents any malfunction of the discriminator outputs when both $f_o+f_s$ and $f_o-f_s$ are present. Discriminator 11 feeds positive pulses to channel output keyer 15 and residual negative pulses are blocked by diode 13. Discriminator 12 feeds negative pulses to channel output keyer 12 and residual positive pulses are similarly blocked by diode 14.

In place of the discriminators shown, it is also possible to use a high-low pass filter combination whereby the filter in the channel 1 circuit rejects all frequencies below $f_o$ and filter in channel 2 circuit rejects all frequencies above $f_o$; the output keyers being adapted to convert the frequencies into corresponding voltages.

Thus the invention retains the essential advantages of FM while reducing the bandwidth necessary for transmitting and receiving two channels. This advantage is not, however, a "something-for-nothing" gain over the art, as there is a division of power when the two frequencies are transmitted simultaneously. Nevertheless, the loss of power (about 3 db) is considered insignificant and the benefit derived from this trade of power for message capability far overshadows the minor disadvantages noted.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A multi-channel frequency-modulated telegraph system comprising a center frequency source for each pair of channels, a pair of frequency sources spaced in frequency above and below said center frequency, a common output line, means for selectively switching one of said pair of spaced frequency sources and said center frequency source responsive to "mark" and "space" information over one of said pair of channels to said common output line, means for selectively switching the other of said spaced frequency sources and said center frequency source responsive to "mark" and "space" information over the other of said pair of channels to said common output line, and receiving means comprising means for discriminating the three frequencies according to their respective channels.

2. A multi-channel FM telegraph system as claimed in claim 1, said receiving means further comprising a frequency filter for rejecting all save the three frequencies of the corresponding pair of channels.

3. A multi-channel frequency modulation telegraph system according to claim 1 in which said means for selectively switching comprises a two-position gate connected on its input to two of said sources and on its output to said common line.

No references cited.